United States Patent
Huang et al.

(10) Patent No.: US 8,179,970 B2
(45) Date of Patent: *May 15, 2012

(54) LOW POWER VIDEO COMPRESSION CHIPSET FOR PROTABLE APPLICATION

(75) Inventors: Shih-Chia Huang, Taipei (TW); Sy-Yen Kuo, Taipei (TW)

(73) Assignee: National Taiwan University, Taipei (TW)

(*) Notice: Subject to any disclaimer, the term of this patent is extended or adjusted under 35 U.S.C. 154(b) by 435 days.

This patent is subject to a terminal disclaimer.

(21) Appl. No.: 12/469,682

(22) Filed: May 21, 2009

(65) Prior Publication Data

US 2010/0266043 A1 Oct. 21, 2010

(30) Foreign Application Priority Data

Apr. 16, 2009 (TW) ................ 98112680 A

(51) Int. Cl.
H04N 11/04 (2006.01)
(52) U.S. Cl. ......... 375/240.16; 375/240.12; 375/240.01
(58) Field of Classification Search ............ 375/240.16, 375/240.12, 240.01
See application file for complete search history.

(56) References Cited

U.S. PATENT DOCUMENTS

| | | | | |
|---|---|---|---|---|
| 7,362,808 B2* | 4/2008 | Kang | ................ | 375/240.16 |
| 2004/0008780 A1* | 1/2004 | Lai et al. | ................ | 375/240.16 |
| 2004/0028133 A1* | 2/2004 | Subramaniyan et al. | | 375/240.16 |
| 2009/0135911 A1* | 5/2009 | Au et al. | ................ | 375/240.16 |
| 2010/0266044 A1* | 10/2010 | Huang et al. | ............ | 375/240.16 |
| 2010/0322314 A1* | 12/2010 | Huang et al. | ............ | 375/240.16 |

OTHER PUBLICATIONS

Chen et al., Level C+ Data Reuse Scheme for Motion Estimation With Corresponding Coding Orders, IEEE Transactions on Circuits and Systems for Video Technology, vol. 16. No. 4, April 3006, p. 553-p. 558.

Zhu et al., A New Diamond Search Algorithm for Fast Block Matching Motion Estimation, International Conference on Information, Communications and Signal Processing ICICS '97, Singapore, Sep. 9-12, 1997, p. 292-p. 296.

Tuan et al., On the Data Reuse and Memory Bandwidth Analysis for Full-Search Block-Matching VLSI Architecture, IEEE Transactions on Circuits and Systems for Video Technology, vol. 12, No. 1, January 2002, p. 61-p. 72.

* cited by examiner

Primary Examiner — Christopher S Kelley
Assistant Examiner — Jonathan Torchman
(74) Attorney, Agent, or Firm — Jianq Chyun IP Office

(57) ABSTRACT

A data reading method for motion estimation in a video processing chipset is provided. The video processing chipset is coupled to an external memory device, wherein a first frame is stored in the external memory device. In the data reading method, a second frame is first divided into M×N sub frame sets, wherein each of the sub frame sets includes O×P sub frames. Then, each of the sub frame sets is selected in a calculation sequence, wherein the selected sub frame set is stored into an internal memory. Next, a predicted search path of each sub frame in the selected sub frame set is calculated. Thereafter, a predicted reading range is determined, wherein the predicted reading range includes the predicted search paths of the sub frames. Finally, a comparison data is read from the first frame according to the predicted reading range.

12 Claims, 7 Drawing Sheets

|         | Sub frame sub_A | Sub frame sub_B |         |
|---------|-----------------|-----------------|---------|
| Sub frame sub_C | Sub frame sub_1 | Sub frame sub_2 |         |
|         |                 |                 |         |
|         |                 |                 |         |

— sub_set

LOW POWER VIDEO COMPRESSION CHIPSET FOR PROTABLE APPLICATION

CROSS-REFERENCE TO RELATED APPLICATION

This application claims the priority benefit of Taiwan application serial no. 98112680, filed on Apr. 16, 2009. The entirety of the above-mentioned patent application is hereby incorporated by reference herein and made a part of this specification.

BACKGROUND OF THE INVENTION

1. Field of the Invention

The present invention generally relates to a data reading or reusing method for motion estimation, and more particularly, to a data reading or reusing method for motion estimation in a video processing chipset.

2. Description of Related Art

Along with the widespread of the Internet and the advancement of multimedia transmission techniques, digital video communication has become a very important part in our daily life. Generally speaking, a digital video carries a large quantity of data. Accordingly, a digital video has to be compressed in order to reduce the space required for storing the digital video and the bandwidth for transmitting the digital video. An advanced digital video compression technique should be adopted to fully utilize the limited transmission bandwidth and to transmit the most digital videos of the highest quality. H.264 is one of the most advanced video compression techniques and which is established by the International Telecommunication Union (ITU) Video Coding Experts Group (VCEG) together with the International Organization for Standardization (ISO)/International Electrotechnical Commission (IEC) Moving Picture Experts Group (MPEG).

Even though the H.264 technique offers very good compression rate and compression quality, since it supports different block configurations and multiple references, the calculation load thereof is enormous, wherein at least 80% of the calculation load is for motion estimation.

FIG. 1 illustrates the conventional motion estimation in video compression. Referring to FIG. 1, when motion estimation is carried out, a current frame CF is compared with a previous frame PF. The current frame CF is usually divided into a plurality of sub frames, wherein the sub frames include a sub frame PM, and the position of the sub frame PM in the current frame CF is represented with the coordinates (u, v). After that, the sub frames in the current frame CF are sequentially selected. Whether there is any sub frame in the previous frame PF similar to the selected sub frame PM is then determined. A sub frame PS in the previous frame PF corresponding to the sub frame PM in the current frame CF is served as the center of the previous frame PF (i.e., the position of the sub frame PS in the previous frame PF is also represented with the coordinates (u, v)). The area within a predetermined distance d around the sub frame PS is referred to as a search window SW, and the predetermined distance is referred to as a search range. Sub frames are then randomly selected within the search window and compared with the sub frame PM to obtain the most similar sub frame, and this action is called motion estimation.

It should be mentioned that motion estimation requires a large quantity of data to be read and accordingly a good data reading and reusing method should be adopted to reduce the calculation load and memory usage and to maintain the compression quality.

SUMMARY OF THE INVENTION

Accordingly, the present invention is directed to a data reading method for motion estimation in a video processing chipset, wherein the calculation algorithm of the motion estimation is improved, and a comparison data to be read is determined by calculating a predicted motion vector or a predicted search path of each sub frame in a sub frame set, so that the calculation load and memory usage are both reduced.

The present invention is directed to a video processing chipset with improved calculation algorithm for motion estimation therein, wherein a comparison data to be read from an external memory device into the video processing chipset is determined by calculating a predicted motion vector or a predicted search path of each sub frame in a sub frame set, so that the calculation load and memory usage are both reduced.

The present invention provides a data reading method for motion estimation in a video processing chipset. The video processing chipset includes an internal memory, and the video processing chipset is coupled to an external memory device, wherein a first frame is stored in the external memory device. In the data reading method, a second frame is first divided into M×N sub frame sets, and each of the sub frame sets includes O×P sub frames, wherein M, N, O, and P are all integers greater than or equal to 1. Then, each of the sub frame sets is selected from the second frame in a calculation sequence, wherein the selected sub frame set is stored into the internal memory. Next, a predicted search path of each sub frame in the selected sub frame set is calculated. Thereafter, a predicted reading range is determined, wherein the predicted reading range includes the predicted search paths of the sub frames. Finally, a comparison data is read from the first frame in the external memory device according to the predicted reading range.

According to an exemplary embodiment of the present invention, in the data reading method for motion estimation, after each of the sub frame sets is selected from the second frame in the calculation sequence, a sum of absolute difference (SAD) value of the sub frame set is further calculated to determine whether the sub frame set is in a static state.

According to an exemplary embodiment of the present invention, in the data reading method for motion estimation, a predicted motion vector of each sub frame in the selected sub frame set is calculated, and the predicted search path of the sub frame is calculated according to the predicted motion vector thereof and a search pattern. According to an exemplary embodiment of the present invention, a search pattern of a small diamond search algorithm or a search pattern of a large diamond search algorithm is selected according to the real motion vector of an adjacent sub frame.

According to an exemplary embodiment of the present invention, in the data reading method for motion estimation, the search pattern is selected according to the real motion vector of an adjacent sub frame.

According to an exemplary embodiment of the present invention, in the data reading method for motion estimation, while selecting the search pattern of the sub frame in the $i^{th}$ column and the $j^{th}$ row, a motion extent of the sub frame in the $i^{th}$ column and the $j^{th}$ row is determined as:

$$D_x = |(MV_{R\_x(i,j-1)} - MV_{R\_x(i-1,j)}) + \epsilon|$$

$$D_y = |(MV_{R\_y(i,j-1)} - MV_{R\_y(i-1,j)}) + \epsilon|$$

wherein $D_x$ is for determining a first component of the motion extent of the sub frame in the $i^{th}$ column and the $j^{th}$ row, $D_y$ is for determining a second component of the motion extent of the sub frame in the $i^{th}$ column and the $j^{th}$ row, $MV_{R\_x(i,j)}$ is the first component of the real motion vector of the sub frame in the $i^{th}$ column and the $j^{th}$ row, $MV_{R\_y(i,j)}$ is the second component of the real motion vector of the sub frame in the $i^{th}$ column and the $j^{th}$ row, and $\epsilon$ is a constant parameter of the sub frame in the $i^{th}$ column and the $j^{th}$ row. The search pattern of the small diamond search algorithm is selected if both $D_x$ and $D_y$ are smaller than a first threshold, and the search pattern of the large diamond search algorithm is selected if $D_x$ and $D_y$ are not both smaller than the first threshold, wherein i and j are integers greater than or equal to 1, i is smaller than or equal to M×O, and j is smaller than or equal to N×P.

According to an exemplary embodiment of the present invention, in the data reading method for motion estimation, the calculation sequence is to calculate from left to right and from top to bottom.

According to an exemplary embodiment of the present invention, in the data reading method for motion estimation, after the comparison data is read, a real motion vector of each sub frame in the selected sub frame set is further calculated according to the comparison data.

The present invention further provides a video processing chipset including an internal memory. The video processing chipset is coupled to an external memory device, wherein a first frame is stored in the external memory device. The video processing chipset divides a second frame into M×N sub frame sets, wherein each of the sub frame sets includes O×P sub frames, and M, N, O, and P are all integers greater than or equal to 1. The video processing chipset selects each of the sub frame sets from the second frame in a calculation sequence, wherein the selected sub frame set is stored into the internal memory. The video processing chipset calculates a predicted search path of each sub frame in the selected sub frame set and determines a predicted reading range, wherein the predicted reading range includes the predicted search paths of the sub frames. The video processing chipset reads a comparison data from the first frame in the external memory device according to the predicted reading range and stores the comparison data into the internal memory.

According to an exemplary embodiment of the present invention, the video processing chipset further includes a calculation unit, wherein the calculation unit calculates a predicted motion vector of each sub frame in the selected sub frame set and calculates the predicted search path of the sub frame according to the predicted motion vector thereof and a search pattern.

As described above, in exemplary embodiments the present invention, the comparison data to be read is determined according to a predicted motion vector of each sub frame in a sub frame set. Accordingly, when the motion estimation is actually carried out, the quantity of data to be read, the calculation load, and the memory usage are all reduced. In addition, when the motion estimation is actually carried out, the comparison data is read in unit of the sub frame sets, so that the quantity of data repeatedly read between the sub frames is reduced.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE EMBODIMENTS

Figure 1:
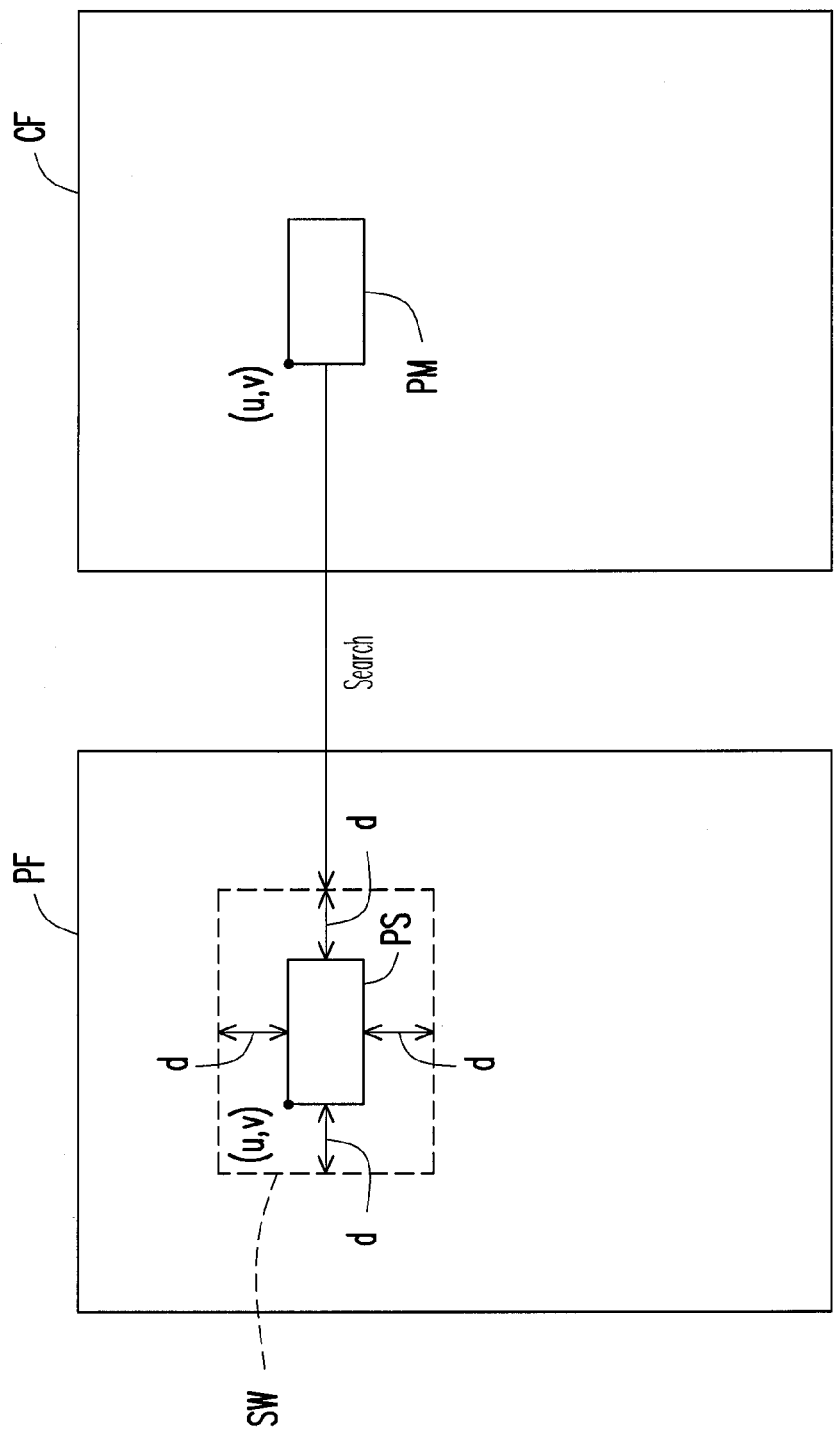
FIG. 1 illustrates the conventional motion estimation in video compression.

Reference will now be made in detail to the present preferred embodiments of the invention, examples of which are illustrated in the accompanying drawings. Wherever possible, the same reference numbers are used in the drawings and the description to refer to the same or like parts.

In exemplary embodiments of the present invention, a predicted motion vector or a predicted search path of a target sub frame is calculated according to a real motion vector of a processed sub frame on which motion estimation has been performed, wherein one or more sub frames form a sub frame set. Besides, a comparison data to be read is determined according to the predicted motion vector or the predicted search path of each sub frame in the sub frame set. In addition, the comparison data is read in unit of the sub frame set. Thereby, the quantity of data repeatedly read between the sub frames, the calculation load, and the memory usage are all reduced. Below, exemplary embodiments of the present invention will be described with reference to accompanying drawings, wherein like reference numerals refer to like elements through out the drawings.

In an exemplary embodiment of the present invention, a data reading method for motion estimation in a video processing chipset is provided. Before describing the data reading method for motion estimation, the video processing chipset will be explained first in order to allow those skilled in the art to better understand the present invention.

Figure 2:
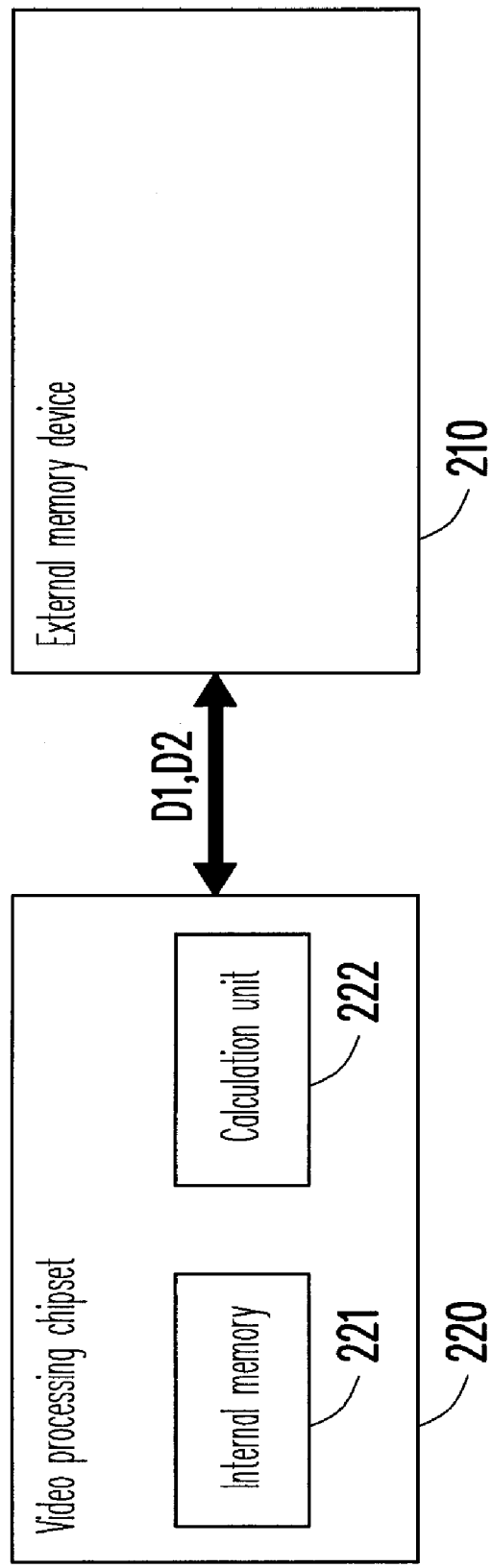
FIG. 2 is a block diagram of a video processing chipset according to an exemplary embodiment of the present invention.

FIG. 2 is a block diagram of a video processing chipset according to an exemplary embodiment of the present invention. Referring to FIG. 2, the external memory device 210 is coupled to the video processing chipset 220, and the video processing chipset 220 includes an internal memory 221 and a calculation unit 222. However, foregoing coupling relationship is not intended to limiting the present invention. Below, the functions of foregoing elements will be described in detail.

The external memory device 210 stores a first frame, selects a comparison data D1 from the first frame, and outputs the comparison data D1 to the video processing chipset 220. The internal memory 221 in the video processing chipset 220 stores a second frame. However, the present invention is not limited thereto, and the second frame may also be stored in the external memory device 210 or other devices. The video processing chipset 220 divides the second frame into a plurality of sub frame sets and uses data of each of the sub frame sets through a data reading method for motion estimation. The video processing chipset 220 further reads the comparison data D1 from the external memory device 210 and stores the comparison data D1 into the internal memory 221.

Figure 3:
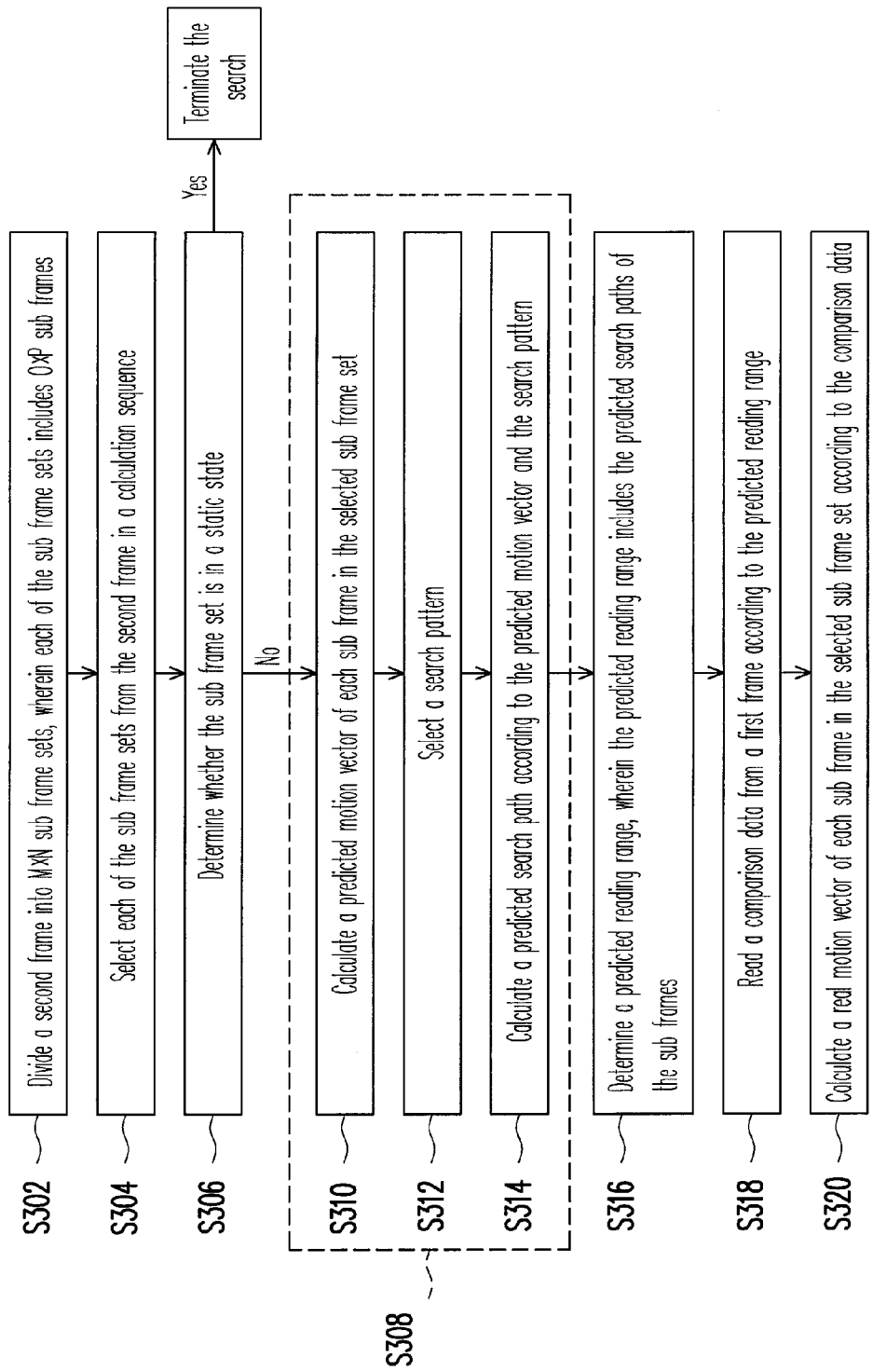
FIG. 3 is a flowchart of a data reading method for motion estimation according to an exemplary embodiment of the present invention.

Next, the data reading method for motion estimation used by the video processing chipset 220 will be described with reference to accompanying FIG. 2 and FIG. 3. FIG. 3 is a flowchart of a data reading method for motion estimation according to an exemplary embodiment of the present invention. In step S302, the video processing chipset 220 divides a second frame into M×N sub frame sets, wherein each of the sub frame sets includes O×P sub frames, and M, N, O, and P are all integers greater than or equal to 1. Next, in step S304, the video processing chipset 220 selects each of the sub frame sets from the second frame in a calculation sequence, for example, the calculation sequence is to select the sub frame sets from left to right and from top to bottom. The selected sub frame set is stored in the internal memory 221. Namely, the video processing chipset 220 loads the selected sub frame set into the internal memory 221 if the internal memory 221 does not contain the second frame.

Thereafter, in step S306, the video processing chipset 220 calculates a sum of absolute difference (SAD) value of each sub frame in the selected sub frame set to determine whether the sub frame set is in a static state. For example, the video processing chipset 220 performs a SAD calculation between pixels to calculate the SAD value of each sub frame in the selected sub frame set, wherein whether the sub frame in the $i^{th}$ column and the $j^{th}$ row of the sub frame set is in the static state can be determined through following equation (1):

$$\alpha = |SAD_{(i,j)} - [(R_{(i,j-1)} + R_{(i-1,j)})/2] + \epsilon| \qquad (1)$$

wherein SAD(i,j) is the SAD value of the sub frame in the $i^{th}$ column and the $j^{th}$ row of the second frame corresponding to the sub frame at the same position in the first frame, $R_{(i,j)}$ is a residual of the sub frame in the $i^{th}$ column and the $j^{th}$ row, and $\epsilon$ is a constant parameter of the sub frame in the $i^{th}$ column and the $j^{th}$ row. If $\alpha$ is smaller than a predetermined value, the video processing chipset 220 determines that the sub frame in the $i^{th}$ column and the $j^{th}$ row is in the static state, and accordingly the search process terminates. If the video processing chipset 220 determines that the sub frame is not in the static state, in step S308, the video processing chipset 220 calculates a predicted search path of each sub frame in the sub frame set selected in step S304.

Foregoing step S308 further includes several sub steps. Referring to FIG. 2 and FIG. 3 again, in step S310, the calculation unit 222 calculates a predicted motion vector of each sub frame in the selected sub frame set. For example, if the selected sub frame is in the $i^{th}$ column and the $j^{th}$ row of the second frame, the calculation unit 222 performs a statistical calculation according to a real motion vector of a calculated sub frame in the $i^{th}$ column or the $j^{th}$ row to calculate the predicted motion vector of the selected sub frame, wherein i and j are both integers greater than or equal to 1, i is smaller than or equal to M×O, and j is smaller than or equal to N×P. To be more specific, when O is 2 and P is 1, each predicted motion vector can be respectively calculated through following equations (2) and (3):

$$MV_{P(i,j)} = [(MV_{R(i,j-1)} + MV_{R(i-1,j)})/2] \pm MV_{E1} \qquad (2)$$

$$MV_{P(i+1,j)} = [(2MV_{R(i+1,j-1)} + MV_{R(i-1,j)})/3] \pm MV_{E2} \qquad (3)$$

wherein $MV_{P(i,j)}$ is the predicted motion vector of the sub frame in the $i^{th}$ column and the $j^{th}$ row, $MV_{R(i,j)}$ is the real motion vector of the sub frame in the $i^{th}$ column and the $j^{th}$ row, $MV_{E1}$ is a first error vector, and $MV_{E2}$ is a second error vector.

Figures 4, 5:
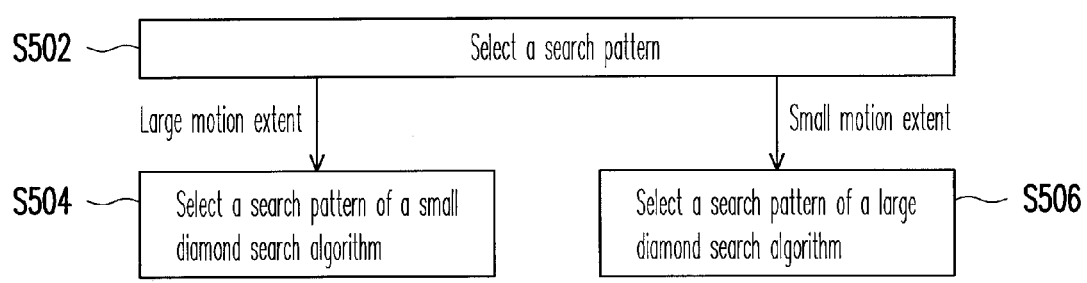
FIG. 4 illustrates an example of how to calculate motion vectors according to an exemplary embodiment of the present invention.
FIG. 5 is a flowchart illustrating how to select a search pattern in motion estimation according to an exemplary embodiment of the present invention.

FIG. 4 illustrates an example of how to calculate motion vectors according to an exemplary embodiment of the present invention. Referring to FIG. 2 and FIG. 4, the calculation unit 222 divides a second frame into M×N sub frame sets sub_set, wherein each of the sub frame sets has O×P sub frames. When O=2 and P=1, each sub frame set has 2 sub frames, and the sub frame sets may be sequentially selected from left to right. Herein it is assumed that the sub frame set sub_set has 2 sub frames sub_1 and sub_2. The calculation unit 222 calculates a predicted motion vector of each sub frame in the sub frame set sub_set. To be specific, the predicted motion vector $MV_1$ of the sub frame sub_1 and the predicted motion vector $MV_2$ of the sub frame sub_2 in the sub frame set sub_set can be obtained according to the real motion vector $MV_A$ of the sub frame sub_A, the real motion vector $MV_B$ of the sub frame sub_B, and the real motion vector $MV_C$ of the sub frame sub_C through following equations (4) and (5):

$$MV_1 = [(MV_A + MV_C)/2] \pm MV_{E1} \qquad (4)$$

$$MV_2 = [(2MV_B + MV_C)/3] \pm MV_{E2} \qquad (5)$$

wherein $MV_{E1}$ and $MV_{E2}$ are error vectors and which represent that the predicted motion vectors $MV_1$ and $MV_2$ can change within a certain range, and the error vectors can be determined according to the actual requirement by those skilled in the art.

Thereafter, in step S312, the calculation unit 222 selects a search pattern. FIG. 5 is a flowchart illustrating how to select a search pattern in motion estimation according to an exemplary embodiment of the present invention. In step S502, the search pattern is selected according to the real motion vector of an adjacent sub frame. If the selected sub frame is determined to have a small motion extent according to the real motion vector of the adjacent sub frame, in step S504, the search pattern of the small diamond search algorithm is selected as the search pattern in step S314. If the selected sub frame is determined to have a large motion extent according to the real motion vector of the adjacent sub frame, in step S506, a search pattern of the large diamond search algorithm is selected as the search pattern in step S314.

For example, when the search pattern of the sub frame in the $i^{th}$ column and the $j^{th}$ row is selected, the motion extent of the sub frame in the $i^{th}$ column and the $j^{th}$ row is determined through following equations (6) and (7):

$$D_x = |(MV_{R\_x(i,j-1)} - MV_{R\_x(i-1,j)}) + \epsilon| \qquad (6)$$

$$D_y = |(MV_{R\_y(i,j-1)} - MV_{R\_y(i-1,j)}) + \epsilon| \qquad (7)$$

wherein $D_x$ is for determining a component of the motion extent of the sub frame in the $i^{th}$ column and the $j^{th}$ row in the direction x, $D_y$ is for determining a component of the motion extent of the sub frame in the $i^{th}$ column and the $j^{th}$ row in the direction y, $MV_{R\_x(i,j)}$ is the component of the real motion vector of the sub frame in the $i^{th}$ column and the $j^{th}$ row in the direction x, $MV_{R\_y(i,j)}$ is the component of the real motion vector of the sub frame in the $i^{th}$ column and the $j^{th}$ row in the direction y, and $\epsilon$ is a constant parameter of the sub frame in the $i^{th}$ column and the $j^{th}$ row. The search pattern of the small diamond search algorithm is selected if both $D_x$ and $D_y$ are smaller than a first threshold. The search pattern of the large diamond search algorithm is selected if $D_x$ and $D_y$ are not both smaller than the first threshold. It should be noted that even though the search pattern of the large diamond search algorithm and the search pattern of the small diamond search algorithm are used in foregoing embodiment of the present invention, the present invention is not limited thereto, and the actual search algorithm adopted by the search pattern can be determined by those skilled in the art according to the actual requirement.

Thereafter, in step S316, the calculation unit 222 determines a predicted reading range, wherein the predicted reading range includes the predicted search paths of the sub frames obtained in step S308. In step S318, the video processing chipset 220 reads a comparison data D1 from the first frame in the external memory device 210 according to the predicted reading range determined in step S316. To be specific, the comparison data D1 is selected from the first frame in the external memory device 210 according to the predicted reading range determined in step S316, and the video processing chipset 220 receives the comparison data D1 and stores it into the internal memory 221. Finally, in step S320, the video processing chipset 220 calculates the real motion vector of each sub frame in the selected sub frame set according to the comparison data D1.

For example, after the video processing chipset 220 receives the comparison data D1, the video processing chipset 220 selects the search pattern in step S502 (for example, the search pattern of the large diamond search algorithm) and then calculates the real motion vector of each sub frame in the selected sub frame set. The video processing chipset 220 calculates the SAD values of the sub frames in the selected sub frame set to calculate the real motion vectors of the sub frames.

Figure 6:
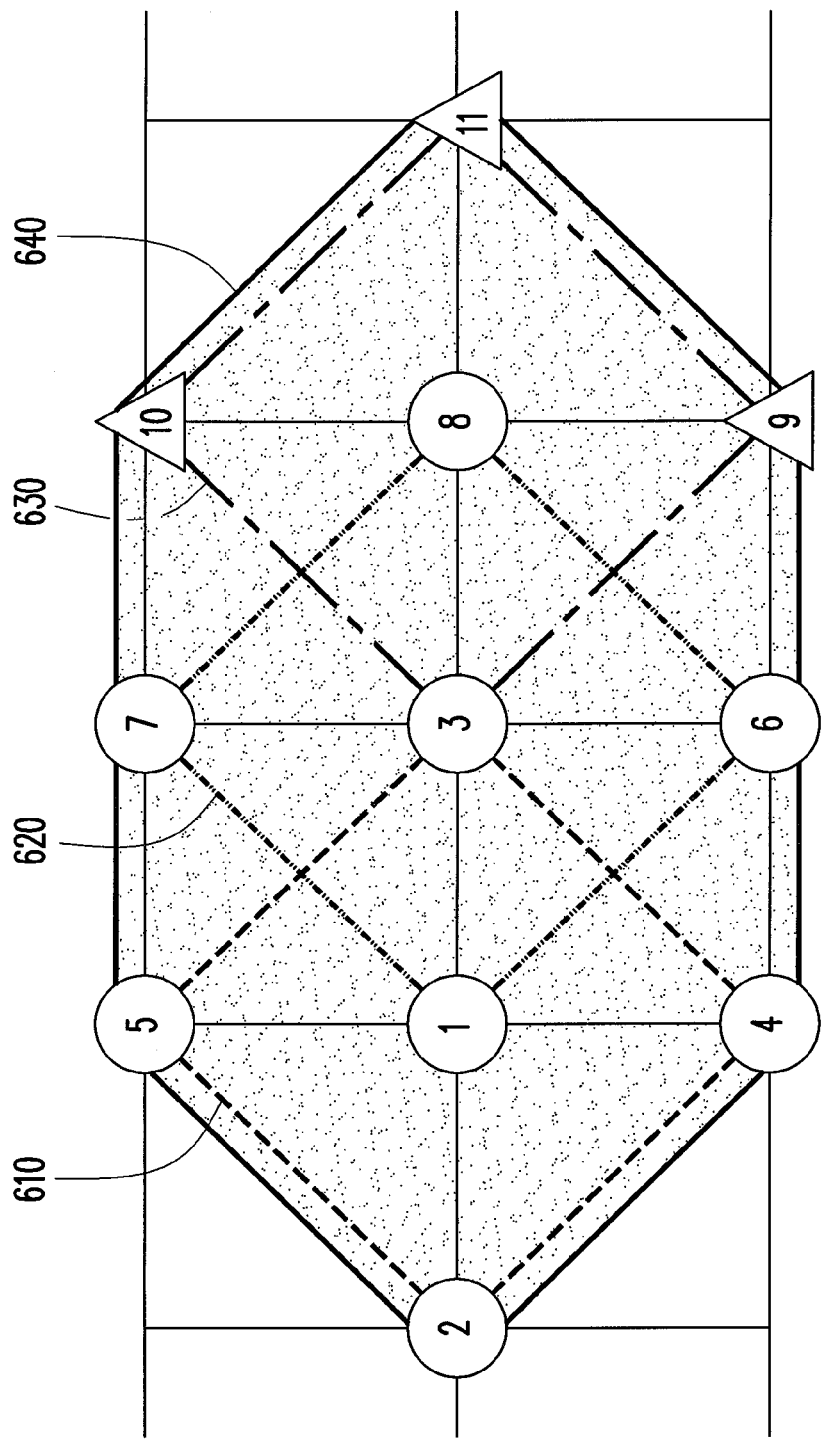
FIG. 6 illustrates a search pattern of a small diamond search algorithm.

FIG. 6 illustrates a search pattern of the small diamond search algorithm. Referring to FIG. 6, when the real motion vectors of the sub frames are calculated through the small diamond search algorithm, first, whether a central area 1 in the search pattern 610 of the small diamond search algorithm is the area having the smallest error is determined by calculating the SAD values of the sub frames. If the area 1 is determined to be the area having the smallest error, the sub frame is determined as in a static state and the search action is terminated. If the area 1 is determined as not the area having the smallest error, the center point is moved to a search point in the area having the smallest error. For example, if area 3 is the area having the smallest error in the search pattern 610, the area 3 is served as the center point for executing the small diamond search algorithm for the second time. Then, 3 new search points are added when the small diamond search algorithm is executed for the second time. The positions of these search points are determined as: if the center point is a search point above the original center point, adding the 3 new search points above the center point, to the left of the center point, and to the right of the center point at a distance 1 away; if the center point is a search point below the original center point, adding the 3 new search points below the center point, to the left of the center point, and to the right of the center point at a distance 1 away; if the center point is a search point to the left of the original center point, adding the 3 new search points to the left of the center point, above the center point, and below the center point at a distance 1 away; and if the center point is a search point to the right of the original center point, adding the 3 new search points to the right of the center point, above the center point, and below the center point at a distance 1 away.

After that, when the area 3 is served as the center point for executing the small diamond search algorithm for the second time and the area 8 is determined as the area having the smallest error in the search pattern 620, a search pattern 630 is further added and this process is continued until the center point in the search pattern is determined to be the area having the smallest error. Accordingly, the real motion vector can be obtained by connecting the area 1 in the search pattern 610 to the last area having the smallest error. The predicted reading range 640 includes the search pattern 610, the search pattern 620, and the search pattern 630.

Figure 7:
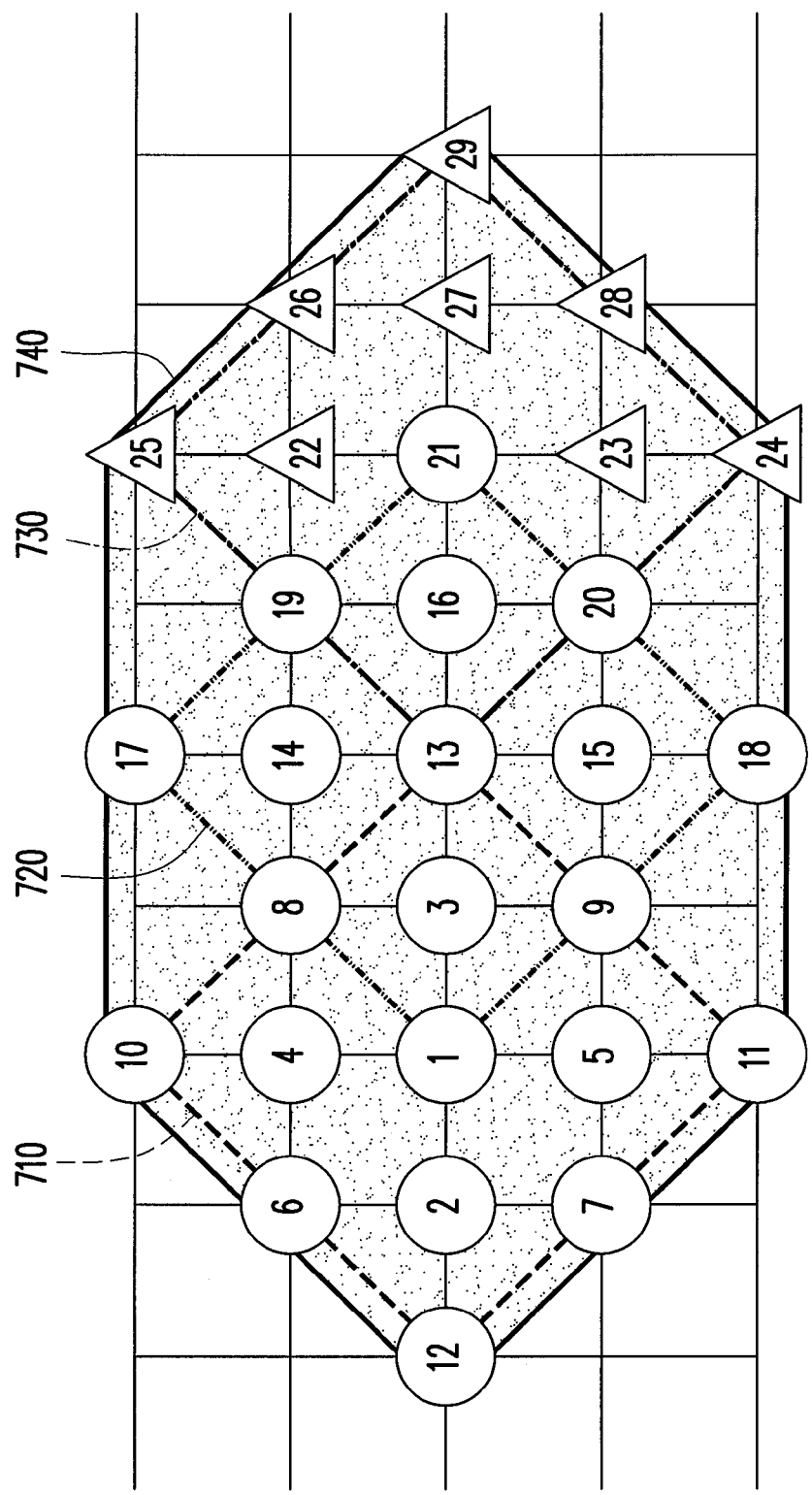
FIG. 7 illustrates a search pattern of a large diamond search algorithm.

FIG. 7 illustrates a search pattern of the large diamond search algorithm. Referring to FIG. 7, if the real motion vectors of the sub frames are calculated by using the large diamond search algorithm, first, whether a central area in the search pattern 710 of the large diamond search algorithm is the area having the smallest error is determined by calculating the SAD values of the sub frames. If area 1 is determined as the area having the smallest error, the sub frame is determined as in the static state and the search action is terminated. If the area 1 is determined as not the area having the smallest error, the center point is moved to a search point in the area having the smallest error. For example, if area 13 is the area having the smallest error in the search pattern 710, the area 13 is served as the center point for executing the large diamond search algorithm for the second time. When the small diamond search algorithm is executed for the second time and the area 21 is determined as the area having the smallest error in the search pattern 720, a search pattern 730 is further added and this process is continued until the center point of the search pattern is the area having the smallest error. Thus, the real motion vector can be obtained by connecting the area 1 in the search pattern 710 to the last area having the smallest error. The predicted reading range 740 includes the search pattern 710, the search pattern 720, and the search pattern 830.

Thereafter, in step S320, if the real motion vector cannot be calculated based on the comparison data D1, a comparison data D2 can be further selected from the first frame in the external memory device 210 according to the SAD calculation result to calculate the real motion vector.

After the predicted motion vector of each sub frame in the sub frame set is obtained, the predicted search path of each sub frame can be obtained according to the corresponding predicted motion vector of the sub frame and the search pattern of the large diamond search algorithm or the small diamond search algorithm. The relationship between the predicted reading range and the predicted search paths will be described below with reference to an example.

Figure 8:
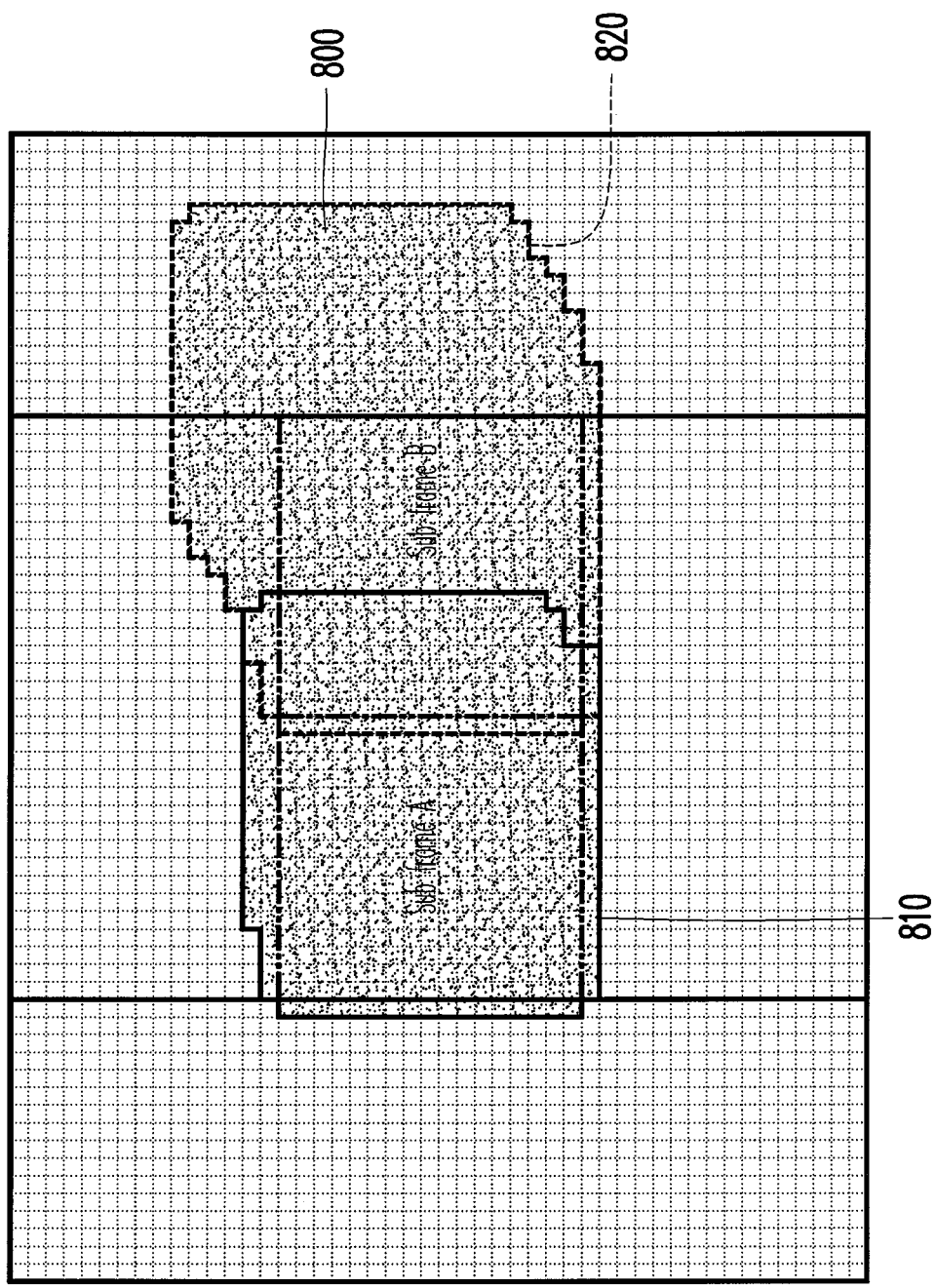
FIG. 8 illustrates an example of how to calculate a search range according to an exemplary embodiment of the present invention.

FIG. 8 illustrates an example of how to calculate a search range according to an exemplary embodiment of the present invention. Referring to FIG. 8, in the present example, each sub frame set has two sub frames, wherein the predicted search path 810 of the sub frame A is obtained according to the predicted motion vector of the sub frame A and a search pattern, the predicted search path 820 of the sub frame B is obtained according to the predicted motion vector of the sub frame B and the search pattern, and the predicted reading range 800 includes the predicted search path 810 of the sub frame A and the predicted search path 820 of the sub frame B.

As described above, the present invention provides a data reading method for motion estimation in a video processing chipset, wherein the calculation algorithm of the motion estimation is improved, and the comparison data to be read is determined through calculation the predicted motion vector of each sub frame. Besides, multiple sub frames form a sub frame set, and the comparison data is read in unit of the sub frame sets. Accordingly, the quantity of data to be repeatedly read between the sub frames, the calculation load of the reading operations, and the memory usage are all reduced. According to the present invention, motion vectors are predicted and the comparison data is read in unit of sub frame sets, so that the quantity of data to be repeatedly read between the sub frames can be reduced. Herein, the number of sub frames in each sub frame set is not limited, and it is within the scope and spirit of the present invention as long as the quantity of data to be repeatedly read between the sub frames is reduced by reading the comparison data in unit of the sub frame sets.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data reading method for motion estimation in a video processing chipset, wherein the video processing chipset comprises an internal memory and a calculating unit, the video processing chipset is coupled to an external memory device, and a first frame is stored in the external memory device, the data reading method comprising:

dividing a second frame into M×N sub frame sets with the video processing chipset, wherein each of the sub frame sets comprises O×P sub frames, and M, N, O, and P are integers greater than or equal to 1;

selecting each of the sub frame sets from the second frame in a calculation sequence with the video processing chipset, wherein the selected sub frame set is stored into the internal memory;

calculating a predicted search path of each of the sub frames in the selected sub frame set with the calculation unit, wherein the steps of calculating the predicted search path comprising:

calculating a predicted motion vector of each of the sub frames in the selected sub frame set; and calculating the predicted search path of each of the sub frames according to the predicted motion vector of the sub frame and a search pattern which is selected according to a real motion vector of the adjacent sub frame, wherein when O is 2 and P is 1, $$MV_{P(i,j)} = [MV_{R(i,j-1)} + MV_{R(i-1,j)}]/2] \pm MV_{E1}$$

$$MV_{P(i+1,j)} = [(2MV_{R(i+1,j-1)} + MV_{R(i-1,j)})/3] \pm MV_{E2}$$

wherein $MV_{P(i,j)}$ is the predicted motion vector of the sub frame in the $i^{th}$ column and the $j^{th}$ row, $MV_{R(i,j)}$ is the real motion vector of the sub frame in the $i^{th}$ column and the $j^{th}$ row, $MV_{E1}$ is a first error vector, and $MV_{E2}$ is a second error vector;

determining a predicted reading range, wherein the predicted reading range comprises the predicted search paths of the sub frames; and reading a comparison data from the first frame in the external memory device according to the predicted reading range.

2. The data reading method according to claim 1, wherein after selecting each of the sub frame sets from the second frame in the calculation sequence, the data reading method further comprises calculating a sum of absolute difference (SAD) value of the sub frame set to determine whether the sub frame set is in a static state.

3. The data reading method according to claim 1, wherein when the search pattern of the sub frame in an $i^{th}$ column and a $j^{th}$ row is selected, a motion extent of the sub frame in the $i^{th}$ column and the $j^{th}$ row is determined as:

$$D_x = |(MV_{R\_x(i,j-1)} - MV_{R\_x(i-1,j)}) + \epsilon|$$

$$D_y = |(MV_{R\_y(i,j-1)} - MV_{R\_y(i-1,j)}) + \epsilon|$$

wherein $D_x$ is for determining a first component of the motion extent of the sub frame in the $i^{th}$ column and the $j^{th}$ row, $D_y$ is for determining a second component of the motion extent of the sub frame in the $i^{th}$ column and the $j^{th}$ row, $MV_{R\_x(i,j)}$ is a first component of the real motion vector of the sub frame in the $i^{th}$ column and the $j^{th}$ row, $MV_{R\_y(i,j)}$ is a second component of the real motion vector of the sub frame in the $i^{th}$ column and the $i^{th}$ row, ands is a constant parameter of the sub frame in the $i^{th}$ column and the $j^{th}$ row, a search pattern of a small diamond search algorithm is selected if both $D_x$ and $D_y$ are smaller than a first threshold, and a search pattern of a large diamond search algorithm is selected if $D_x$ and $D_y$ are not both smaller than the first threshold, wherein i and j are integers greater than or equal to 1, i is smaller than or equal to M×O, and j is smaller than or equal to N×P.

4. The data reading method according to claim 1, wherein in the step of calculating the predicted motion vector of each of the sub frames in the selected sub frame set, if the selected sub frame is in the $i^{th}$ column and the $j^{th}$ row of the second frame, a statistical calculation is performed according to the real motion vector of a calculated sub frame in the $i^{th}$ column or the $j^{th}$ row to calculate the predicted motion vector of the selected sub frame, wherein i and j are integers greater than or equal to 1, i is smaller than or equal to M×O, and j is smaller than or equal to N×P.

5. The data reading method according to claim 1, wherein the calculation sequence is to calculate from left to right and from top to bottom.

6. The data reading method according to claim 1, wherein after the comparison data is read, the data reading method further comprises:

calculating the real motion vector of each of the sub frames in the selected sub frame set according to the comparison data.

7. A video processing chipset, coupled to an external memory device, wherein a first frame is stored in the external memory device, and the video processing chipset comprises an internal memory, the video processing chipset divides a second frame into M×N sub frame sets, wherein each of the sub frame sets comprises O×P sub frames, and M, N, O, and P are all integers greater than or equal to 1, the video processing chipset selects each of the sub frame sets from the second frame in a calculation sequence, and the selected sub frame set is stored into the internal memory, the video processing chipset calculates a predicted search path of each of the sub frames in the selected sub frame set and determines a predicted reading range, wherein the predicted reading range comprises the predicted search paths of the sub frames, and the video processing chipset selects a comparison data from the first frame in the external memory device according to the predicted reading range and stores the comparison data into the internal memory, and the video processing chipset comprises a calculation unit, the calculation unit calculates a predicted motion vector of each of the sub frames in the selected sub frame set and calculates the predicted search path of the sub frame according to the predicted motion vector of the sub frame and a search pattern, wherein if the selected sub frame is in the $i^{th}$ column and the $j^{th}$ row of the second frame, the calculation unit performs a statistical calculation according to the real motion vector of a calculated sub frame in the $i^{th}$ column or the $j^{th}$ row to calculate the predicted motion vector of the selected sub frame, wherein i and j are integers greater than or equal to 1, i is smaller than or equal to M×O, and j is smaller than or equal to N×P, wherein when O is 2 and P is 1, the calculation unit calculates the predicted motion vector of the selected sub frame as:

$$MV_{P(i,j)}=[(MV_{R(i,j-1)}+MV_{R(i-1,j)})/2]\pm MV_{E1}$$

$$MV_{P(i+1,j)}=[(2MV_{R(i+1,j-1)}+MV_{R(i-1,j)})/3]\pm MV_{E2}$$

wherein $MV_{P(i,j)}$ is the predicted motion vector of the sub frame in the $i^{th}$ column and the $j^{th}$ row, $MV_{R(i,j)}$ is the real motion vector of the sub frame in the $i^{th}$ column and the $j^{th}$ row, $MV_{E1}$ is a first error vector, and $MV_{E2}$ is a second error vector.

8. The video processing chipset according to claim 7, wherein after the video processing chipset selects each of the sub frame sets from the second frame in the calculation sequence, the video processing chipset calculates a SAD value of the sub frame set to determine whether the sub frame set is in a static state.

9. The video processing chipset according to claim 7, wherein the calculation unit selects the search pattern according to a real motion vector of the adjacent sub frame.

10. The video processing chipset according to claim 9, wherein when the calculation unit selects the search pattern of the sub frame in the $i^{th}$ column and the $j^{th}$ row, the calculation unit determines a motion extent of the sub frame in the $i^{th}$ column and the $j^{th}$ row as:

$$D_x=|(MV_{R\_x(i,j-1)}-MV_{R\_x(i-1,j)})+\epsilon|$$

$$D_y=|(MV_{R\_y(i,j-1)}-MV_{R\_y(i-1,j)})+\epsilon|$$

wherein $D_x$ is for determining a first component of the motion extent of the sub frame in the $i^{th}$ column and the $j^{th}$ row, $D_y$ is for determining a second component of the motion extent of the sub frame in the $i^{th}$ column and the $j^{th}$ row, $MV_{R\_x(i,j)}$ is the first component of the real motion vector of the sub frame in the $i^{th}$ column and the $j^{th}$ row, $MV_{R\_y(i,j)}$ is the second component of the real motion vector of the sub frame in the $i^{th}$ column and the $j^{th}$ row, and c is a constant parameter of the sub frame in the $i^{th}$ column and the $j^{th}$ row, a search pattern of a small diamond search algorithm is selected if both $D_x$ and $D_y$ are both smaller than a first threshold, and a search pattern of a large diamond search algorithm is selected if $D_x$ and $D_y$ are not both smaller than the first threshold, wherein i and j are integers greater than or equal to 1, i is smaller than or equal to M×O, and j is smaller than or equal to N×P.

11. The video processing chipset according to claim 7, wherein the calculation sequence used by the calculation unit is to calculate from left to right and from top to bottom.

12. The video processing chipset according to claim 7, wherein after the calculation unit reads the comparison data, the calculation unit further calculates the real motion vector of each of the sub frames in the selected sub frame set according to the comparison data.

\* \* \* \* \*